W. C. WOODLAND.
VIBRATOR FOR SIEVES.
APPLICATION FILED JULY 31, 1909.
1,012,956.
Patented Dec. 26, 1911.
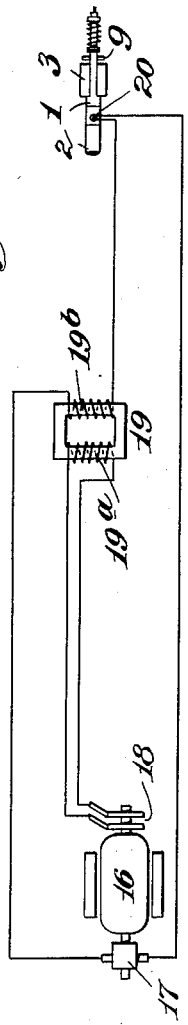
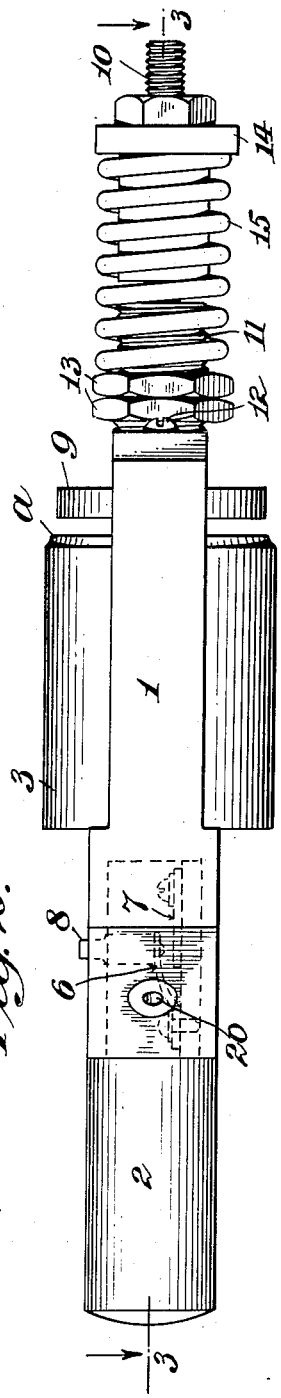
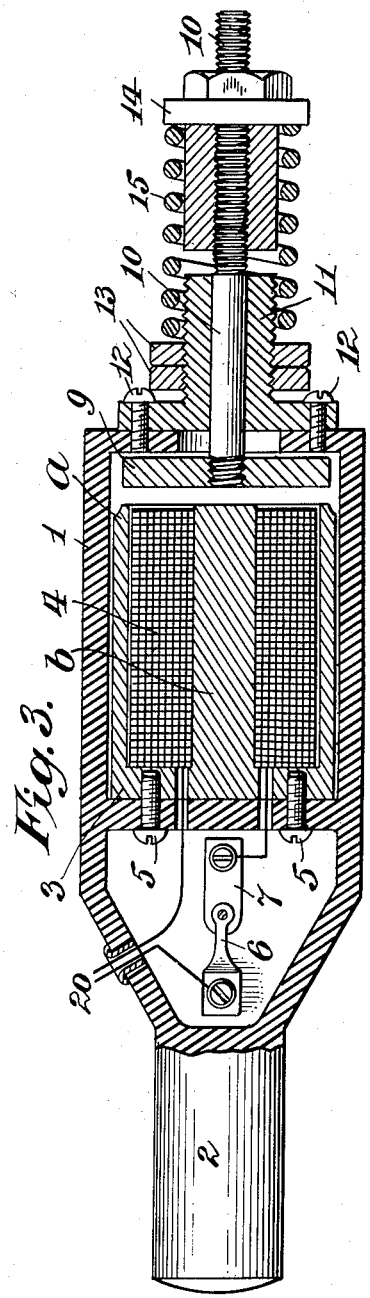
Attest:
Inventor:
William C. Woodland
by Wm. R. Baird Atty.

UNITED STATES PATENT OFFICE.

WILLIAM C. WOODLAND, OF WARREN, OHIO.

VIBRATOR FOR SIEVES.

1,012,956.  Specification of Letters Patent.  Patented Dec. 26, 1911.

Application filed July 31, 1909. Serial No. 510,603.

*To all whom it may concern:*

Be it known that I, WILLIAM C. WOODLAND, a citizen of the United States, and resident of Warren, Ohio, have invented certain new and useful Improvements in Vibrators for Sieves, &c., of which the following is a specification.

The primary object of my invention is its application to the dredgers used for sifting powdered enameling material over the surface of bath tubs and other articles in the manufacture of enameled ware, although the invention may have application elsewhere as hereinafter pointed out. The reason that the invention is specially adapted for use in connection with dredgers is that it gives precisely the kind of vibrating action to the sieve to cause it to deliver the powdered enameling material in a substantially continuous and even manner. It will be noted that the manner of distribution of the enameling material over the surface to be enameled is of the utmost importance, since upon it depends the perfectly smooth, continuous surface demanded of this ware by the trade, any serious impairment of this quality making the article a "second", if not entirely unmarketable.

In the drawings, Figure 1 is a diagrammatic view of the sieve, the vibrator and the electrical operating devices, Fig. 2 is an elevation on a larger scale of the vibrator, and Fig. 3 is a horizontal section partly in plan on the line 3—3 in Fig. 2.

Describing now the devices of the drawings and reserving it to the claims to point out the novel features and to define the scope of the invention, 1 is the frame of the vibrator, preferably made of aluminium or other non-magnetic material, said frame having a handle 2. The frame supports an electro-magnet consisting of an iron core-part 3 and a winding 4. The core-part takes the form of a cup $a$ with a central projection $b$ from its bottom surrounded by the winding. It will be seen that the core is secured to the frame by screws 5 with the open or mouth end of its cup directed away from the handle. The lead wires 20 to the winding come out through the base of the cup and thence through the frame, one of said wires including in its circuit a pair of contacts, one of which consists of a spring 6 normally out of contact with the other contact 7 and carrying a button 8 which projects through an opening in the side of the frame where it can be pressed by the operator to bring the two contacts together to close the electrical circuit through the winding of the magnet.

The rim of the cup $a$ and the end of its central projection $b$ constitute the poles of the magnet and an iron disk 9 is provided to coöperate therewith as an armature. This disk is supported on a stem 10 sliding in a sleeve 11, the latter secured by screws 12 to the end of the frame opposite the handle 2.

The sleeve 11 is externally threaded and carries a main nut and a jam nut, together designated 13. The free end of the stem 10 is screw threaded and reduced in diameter sufficiently to permit the required extent of reciprocation of the stem into the sleeve 11 caused by the attraction of the armature by the magnet. A sleeve nut 14 is provided on the threaded portion of the stem; and located between the shoulder of this nut and the nuts 13 is a spiral spring 15 surrounding the sleeve 11 and the sleeve of the nut 14. The end of the stem 10 projecting beyond the nut 14 serves for convenient attachment with the sieve of the dredger, this being accomplished by passing the end of the stem through a suitable opening in the frame of the sieve and applying a nut to the stem on the other side of the frame opening.

It will be apparent from the description thus far that when the magnet is energized, it will attract its armature 9 and will put under increased compression the spring 15, whereas said spring will cause opposite reciprocation of the armature and stem when the magnet is deënergized or when it is deënergized to an extent where the spring overpowers the attraction of the magnet for its armature.

The electrical devices and connections shown are as follows: 16 represents a dynamo furnished with a commutator 17 at one end of its armature and a pair of collector rings 18 at the other, said dynamo being wound and constructed to supply both direct and alternating currents. It is possible to connect both the direct current brushes and the alternating current brushes directly to the magnet winding 4, but as it is desirable to vary the relation between the direct and alternating voltages, a transformer 19 is interposed, the alternating current brushes being connected with the primary 19ª of the transformer and the direct current brushes being connected in series with secondary 19ᵇ of the transformer and with the magnet 4. Thus, it will be seen that the arrangement results in supplying the magnet with a combined direct and alternating current. Moreover, the voltage of both the direct and alternating currents can be changed by the field regulator of the dynamo. Again, the ratio between the voltages of these currents can be controlled by varying the relation between the windings of the transformer, whereas the frequency can be changed by changing the speed of the dynamo. The result aimed at is to have the direct current to so reduce the alternating current on one side of the zero line of its sine or diagram curve and to so reinforce and increase it on the other side that the combined current consists of an alternation of strong and weak pulsations, each strong pulsation as it energizes the magnet overpowering the spring 15 and drawing it to the armature 9, whereas the immediately succeeding pulsation is so weak that the spring overcomes the attraction of the magnet and forces the armature and connected parts outwardly. The sieve of the dredger is thereby given a peculiarly suitable vibration for delivering the powdered enameling material in a substantially continuous even manner. Of course, in addition, there are the incidental advantages as compared with a vibrating contact-maker to make and break the current through the magnet, first, that the latter is always a source of trouble due to its contacts becoming oxidized and the like, second, the high inductive electromotive force produced on suddenly breaking a current is avoided in the present arrangement, and third, the impulses obtained by my invention are far more regular, this last advantage being also bound up with, and to an extent accounting for, the main advantage, set forth above, that the ideal motion is imparted to the sieve of the dredger to effect its special purpose.

It may be noted that the device might have possible use as an electric riveter by providing a hammer, or, for that matter, other suitable tools such as a cutting tool.

Having thus described my invention, what I claim is:

1. In combination, a portable frame adapted to be hand-manipulated, an electromagnet having an iron core-part and a winding, the core-part being cup-shaped and having a central inside projection and the winding surrounding said projection, an armature extending across the mouth of the cup and the end of the projection, a stem supporting said armature, said stem in turn being reciprocatingly supported by the frame and being screw threaded at its free end, a nut on said threaded portion of the stem, and a spiral spring located between said nut and the frame.

2. In a device of the character described, the combination of a portable frame, an armature reciprocatingly supported by the frame, means for vibrating said armature comprising an electro-magnet on the frame and an opposed spring, a transformer, an alternating current source connected to the primary winding of the transformer and inducing an alternating current in the secondary winding, said secondary winding being connected in series with the electro-magnet, and a direct current source connected in series with said secondary winding and the electromagnet.

3. In apparatus of the character set forth, the combination with a dynamo having a direct and an alternating current generating means and collectors therefor, of a reciprocatory motor including an electro-magnet, a transformer having a primary and a secondary winding, a circuit including the direct current collector, the secondary winding of the transformer and the electro-magnet, and a circuit including the alternating current collector and the primary winding of the transformer.

Witness my hand this 27th day of July 1909, at Warren, Ohio.

WM. C. WOODLAND.

Witnesses:
N. A. WOLCOTT,
R. E. GERTON.